(12) United States Patent
Ise

(10) Patent No.: US 6,491,857 B2
(45) Date of Patent: ***Dec. 10, 2002

(54) PROCESS OF PACKAGING SEMICONDUCTOR CHIP IN SYNTHETIC RESIN PRODUCED FROM PRESSURIZED GRANULAR SYNTHETIC RESIN AND MOLDING DIE USED THEREIN

(75) Inventor: Hiroshi Ise, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,343

(22) Filed: Jan. 13, 1998

(65) Prior Publication Data

US 2001/0003385 A1 Jun. 14, 2001

(30) Foreign Application Priority Data

Jan. 13, 1997 (JP) ............................................. 9-003544

(51) Int. Cl.⁷ ......................... B29C 45/02; B29C 45/14; B29C 70/70
(52) U.S. Cl. ........................... 264/272.14; 264/272.15; 264/222.17; 264/328.4
(58) Field of Search ........................ 264/102, 272.11, 264/272.14, 272.17, 328.4, 328.5; 425/116, 504, 544, 112

(56) References Cited

U.S. PATENT DOCUMENTS

| | | | | | |
|---|---|---|---|---|---|
| 3,969,461 | A | * | 7/1976 | Boesch et al. | 264/163 |
| 4,653,993 | A | * | 3/1987 | Boschman | 425/116 |
| 4,761,264 | A | * | 8/1988 | Nishio et al. | 419/68 |
| 4,770,833 | A | * | 9/1988 | Hughes | 264/120 |
| 4,789,512 | A | * | 12/1988 | Hughes | 264/272.11 |
| 4,826,931 | A | * | 5/1989 | Sakai et al. | 525/523 |
| 5,169,586 | A | * | 12/1992 | Noda | 264/272.17 |
| 5,200,125 | A | * | 4/1993 | Osada | 264/272.11 |
| 5,407,505 | A | * | 4/1995 | Groenewegen et al. | 264/272.11 |
| 5,435,953 | A | * | 7/1995 | Osada et al. | 264/102 |
| 5,507,633 | A | * | 4/1996 | Osada et al. | 425/116 |
| 5,800,763 | A | * | 9/1998 | Hoppe et al. | 264/272.11 |
| 5,800,841 | A | * | 9/1998 | Miyajima | 425/89 |

FOREIGN PATENT DOCUMENTS

| | | |
|---|---|---|
| JP | 62261134 | 11/1987 |
| JP | 62261403 | 11/1987 |
| JP | 4164337 | 6/1992 |
| JP | 5-211185 | 8/1993 |
| JP | 5211185 | 8/1993 |

* cited by examiner

Primary Examiner—Angela Ortiz
(74) Attorney, Agent, or Firm—Dickstein, Shapiro, Morin & Oshinsky, LLP.

(57) ABSTRACT

A semiconductor chip mounted on a lead frame is sealed in a synthetic resin package through a molding process, and pressure is applied to synthetic resin softened from granular. synthetic resin so as to evacuate the air from the synthetic resin before injecting the synthetic resin into cavities formed in a molding die, thereby preventing the synthetic resin package from void.

11 Claims, 12 Drawing Sheets

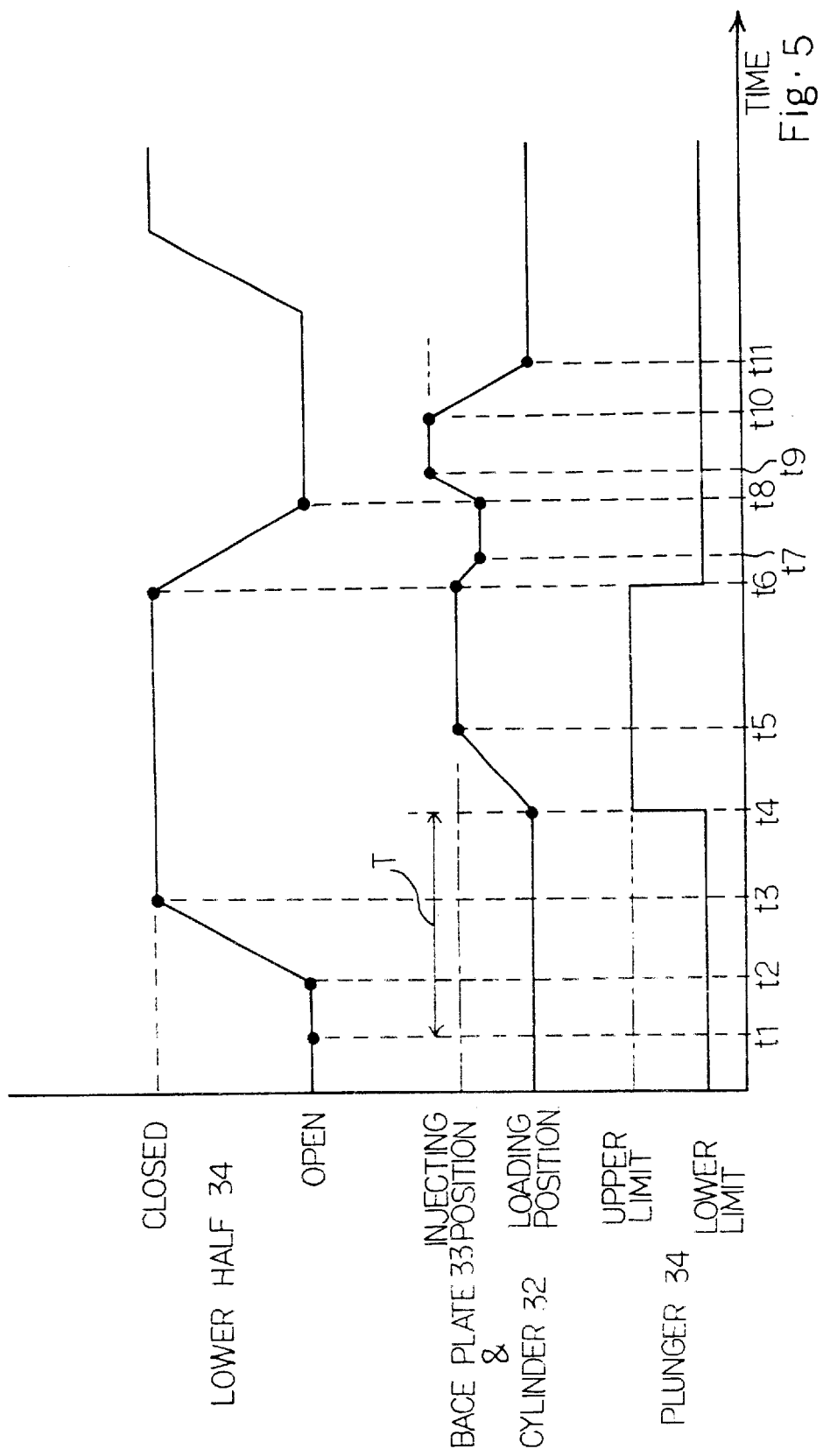

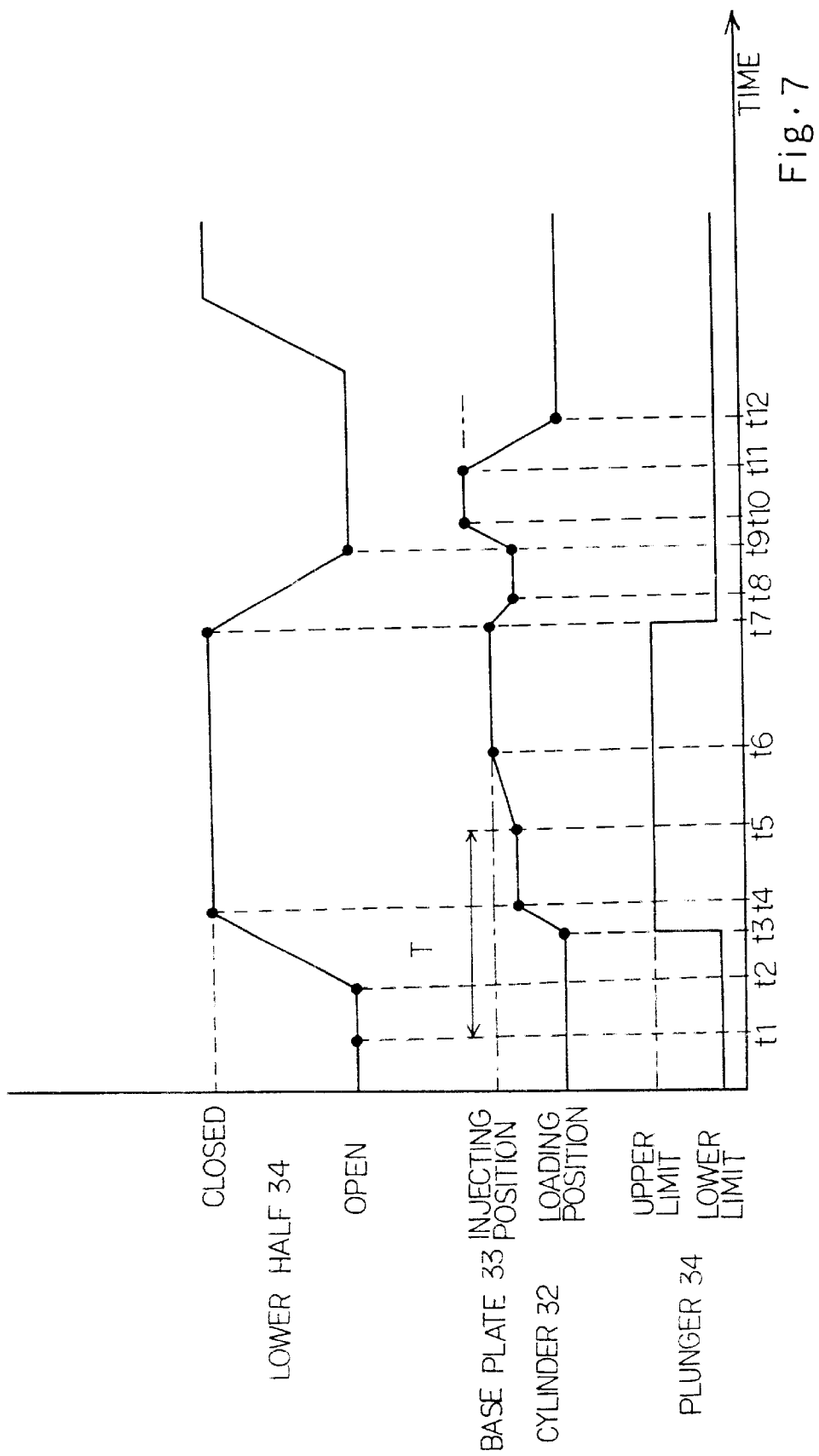

PROCESS OF PACKAGING SEMICONDUCTOR CHIP IN SYNTHETIC RESIN PRODUCED FROM PRESSURIZED GRANULAR SYNTHETIC RESIN AND MOLDING DIE USED THEREIN

FIELD OF THE INVENTION

This invention relates to a semiconductor fabrication technology and, more particularly, to a process of packaging a semiconductor chip in synthetic resin and a molding die used therein.

DESCRIPTION OF THE RELATED ART

Conventionally, when an integrated circuit is fabricated on small areas on a semiconductor wafer, the semiconductor wafer is separated into bare chips, and the bare chip is mounted on a lead frame. The lead frame is placed in a cavity of a mold, and synthetic resin is injected into the cavity so as to seal the bare chip on the lead frame in the synthetic resin.

If granular synthetic resin is used for the packaging, the process traces the sequence shown in FIGS. 1A to 1E. Firstly, the prior art molding apparatus is described hereinbelow.

The prior art molding apparatus largely comprises a molding die 1 and an injection unit 2. The molding die 1 is split into an upper half 3 and a lower half 4, and cavities 5 and 6 are formed in the upper half 3 and the lower half 4, respectively. A pot 7 is inserted into the lower half 4, and is connected through runners 8 to the cavity 6. Ejector pins 9 are slidably inserted into holes formed in the lower half 4, and knock out plates 10 are attached to the ejector pins 9.

On the other hand, the injection unit 2 has an injection cylinder 11 fixed to an injection base plate 12 and a plunger 13 movable with respect to the cylinder 12. Namely, the plunger 13 has one end portion slidably inserted into the cylinder 11 and the other end portion slidably inserted into the pot 7. Though not shown in the drawings, a hydropressurizing system is connected to the cylinder 11, and supplies pressurized oil to the cylinder 11 so as to reciprocally move the plunger 13. Knock out rods 14 are upright from the injection base plate 12, and the injection base plate 12 is movable toward the lower half 4.

The prior art packaging process starts with separation of the molding die 1. The lower half 4 is spaced from the upper half 3. Bare semiconductor chips SC are mounted on a lead frame LF, and the lead frame LF is placed on the lower half 4. Although the pressurized oil maintains the plunger 13 at the upper limit, the injection cylinder 11 and the injection base plate 12 stay at a lower limit or a loading position, and the plunger 13 defines a space in the pot 7. Granular synthetic resin SR is inserted into the pot 7 as shown in FIG. 1A, and the loading work for the granular synthetic resin SR is indicated by point a in FIG. 2.

Subsequently, the lower half 4 starts toward a closed position at point b (see FIG. 2), and is brought into contact with the upper half 3 at point c (see FIG. 2). Thus, the molding die 1 is closed, and the bare semiconductor chips SC are accommodated in the cavities 5 as shown in FIG. 1B.

The granular synthetic resin SR is heated in the pot 7, and is melted. Thereafter, the cylinder 11 and the injection base plate 12 start toward an injecting position at point f (see FIG. 2), and the plunger 13 is also lifted without changing the relative position. The cylinder 11 and the injection base plate 12 reach the injecting position at point g (see FIG. 2), and the plunger 13 evacuates the molten resin from the pot 7 through runners 8 into the cavities 5/6. Thus, the molten resin is injected from point f to point g, and fills the cavities 5/6.

The molding die 1 is cooled, and the molten resin is solidified until point h (see FIG. 2), and the bare semiconductor chips SC are sealed in a synthetic resin package as shown in FIG. 1C.

Subsequently, the lower half starts toward the open position at point d (see FIG. 2), and reaches the open position at point e (see FIG. 2). The injection cylinder 11 and the plunger 13 start from the injecting position and the upper limit at point h (see FIG. 2). The injection cylinder 11 and the injection base plate 12 stop at an intermediate position at point i (see FIG. 2). However, the plunger 13 reaches the limit. As a result, the plunger 13 is spaced front the synthetic resin package PKG at point j as shown in FIG. 1D.

The injection base 12 starts toward the injecting position together with the injection cylinder 11, and the knock out rods 14 are brought into contact with the knock out plates 10 on the way toward the injecting position. The plunger 13 is lifted together with the injection cylinder 11, and the plunger 13 is brought into contact with the synthetic resin package PKG also on the way toward the injection position as shown in FIG. 1E. The injection base plate 12, the injection cylinder 11 and the plunger 13 are further moved upwardly by 1–2 millimeters, and separate the synthetic resin package PKG from the lower half 4 at point k (see FIG. 2). Thus, the synthetic resin package PKG is separated from the lower half 4, and is taken out from the molding die 1. If the plunger 13 is maintained at the upper limit, the plunger 13 is brought into contact with the synthetic resin package PKG earlier than the ejector pins 9, and the plunger would break the synthetic resin during the upward motion of the injection base plate 12.

The injection base plate 12 and the injection cylinder 11 are moved to the loading position, and the plunger 13 is moved to the upper limit. Then, the injection apparatus returns to the initial state at point m (see FIG. 2).

The granular synthetic resin SR is easily loaded into the pot 7 rather than synthetic resin tablets, and the manufacturer exactly regulates the amount of synthetic resin to be required. However, the granular synthetic resin SR carries air into the pot 7, and a void is liable to take place in the synthetic resin package PKG due to the air. The quantily of defective products due to the void are ten times larger than those produced from the synthetic resin tablets.

Japanese Patent Publication of Unexamined Application No. 4-164337 proposes to form the granular synthetic resin into synthetic resin tablets before the supply to the molding die. In detail, granular Synthetic resin is supplied to a cylinder, and is heated and pressed in the cylinder. The molten synthetic resin is shaped into tablets, and the tablet is supplied into the pot of a molding die. While the granular synthetic resin is begins heated and pressed, the air is eliminated from therefrom, and the molded synthetic resin is prevented from containing a void.

However, the granular synthetic resin is firstly changed to the synthetic resin tablets, and the synthetic resin tablets are used for the molding. Thus, the prior art packaging process is complicated. This is the first problem inherent in the prior art packaging process.

Another problem of the prior art molding process disclosed in the Japanese Patent Publication of Unexamined Application is the complicated molding apparatus. The granular synthetic resin is firstly changed to the synthetic resin tablets, and, thereafter, the synthetic resin tablets are used for the molding. In order to change the granular synthetic resin to the synthetic resin tablets, the molding apparatus requires the forming cylinder and the preheating unit for the change from the granular synthetic resin to the synthetic resin tablets. Moreover, various kinds of semiconductor device requires the synthetic resin tablets different in size, and the synthetic resin tablets different in size require different forming cylinders. Therefore, the forming cylinder is changed depending upon the semiconductor device to be molded, and the exchanging work consumes a large amount of time and labor. Thus, the second problem is the requirement of the complicated molding apparatus.

SUMMARY OF THE INVENTION

It is therefore an important object of the present invention to provide a process for packaging a semiconductor chip in synthetic resin which is simple without a complicated molding apparatus.

To accomplish the object, the present invention proposes to evacuate the air from soft synthetic resin by applying pressure thereto.

In accordance with one aspect of the present invention, there is provided a process for packaging a product in synthetic resin, comprising the steps of: a) accommodating a product and granular synthetic resin in a molding die; b) softening the granular synthetic resin so as to produce soft synthetic resin; c) applying pressure to the soft synthetic resin so as to evacuate the air from the soft synthetic resin and d) spreading the soft synthetic resin over an inside space of the molding die so as to seal the product in a synthetic resin package.

In accordance with another aspect of the present invention, there is provided a molding apparatus comprising a molding die formed with cavities for accommodating a product and runners connected to the cavities, a pot connected to the runners and accommodating granular synthetic resin, a heating means associated with the pot for heating the granular synthetic resin so as to produce soft granular synthetic resin, a pressurizing means associated with the pot and applying pressure to the soft synthetic resin so as to evacuate the air from the soft synthetic resin, and an injecting means associated with the pot and injecting the soft synthetic resin through the runners into the cavities after the evacuation of the air.

BRIEF DESCRIPTION OF THE DRAWINGS

The features and advantages of the process and the molding die will be more clearly understood from the following description taken in conjunction with the accompanying drawing in which:

FIG. 5 is a timing chart showing the process for packaging a semiconductor chip in synthetic resin;

FIG. 7 is a timing chart showing yet another process for packaging a semiconductor chip in synthetic resin according to the present invention.

DESCRIPTION OF THE PREFERRED EMBODIMENTS

First Embodiment

Figure 1A:
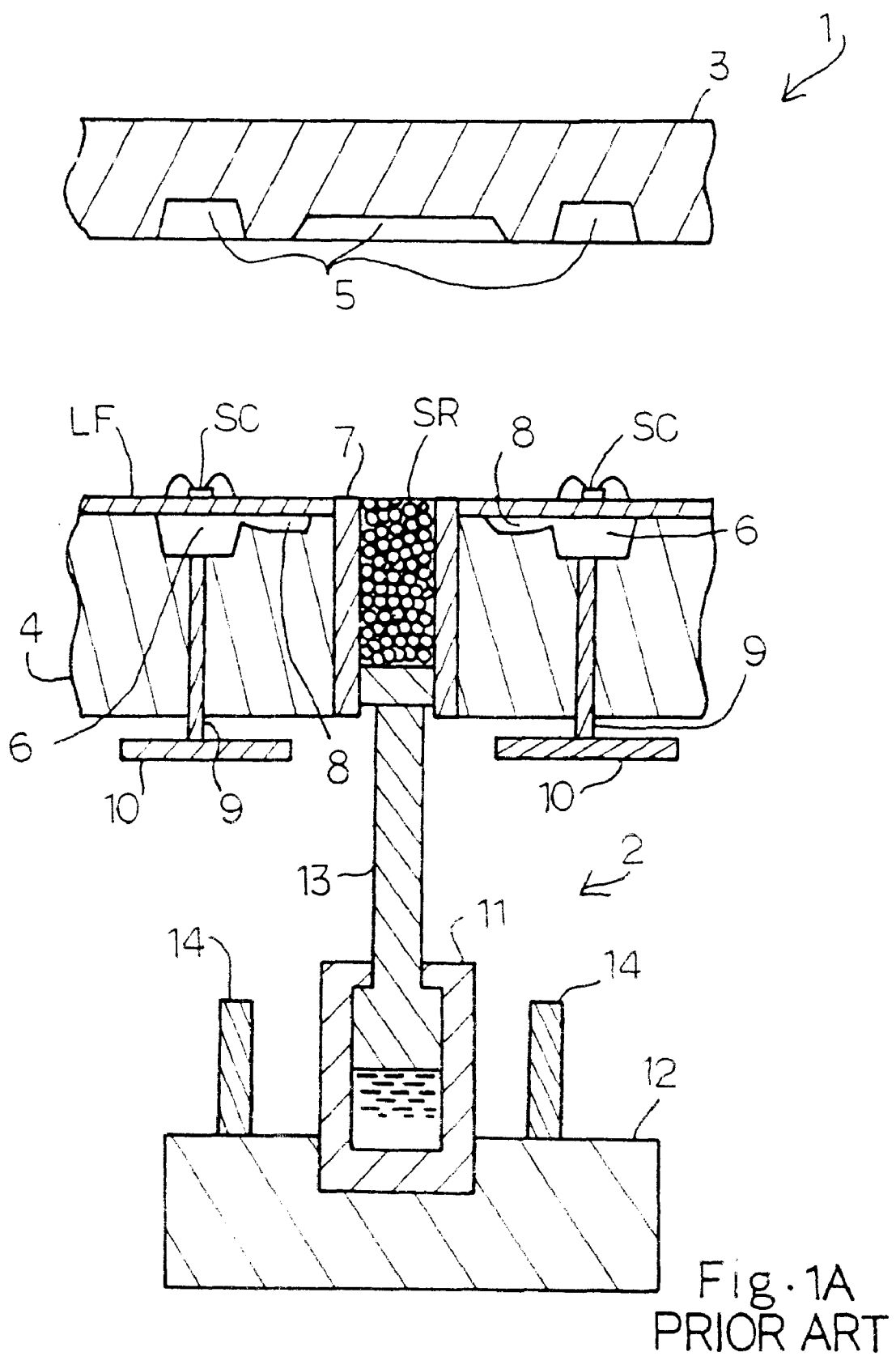
FIGS. 1A to 1E are cross sectional views showing the prior art packaging process.
Figure 1B:
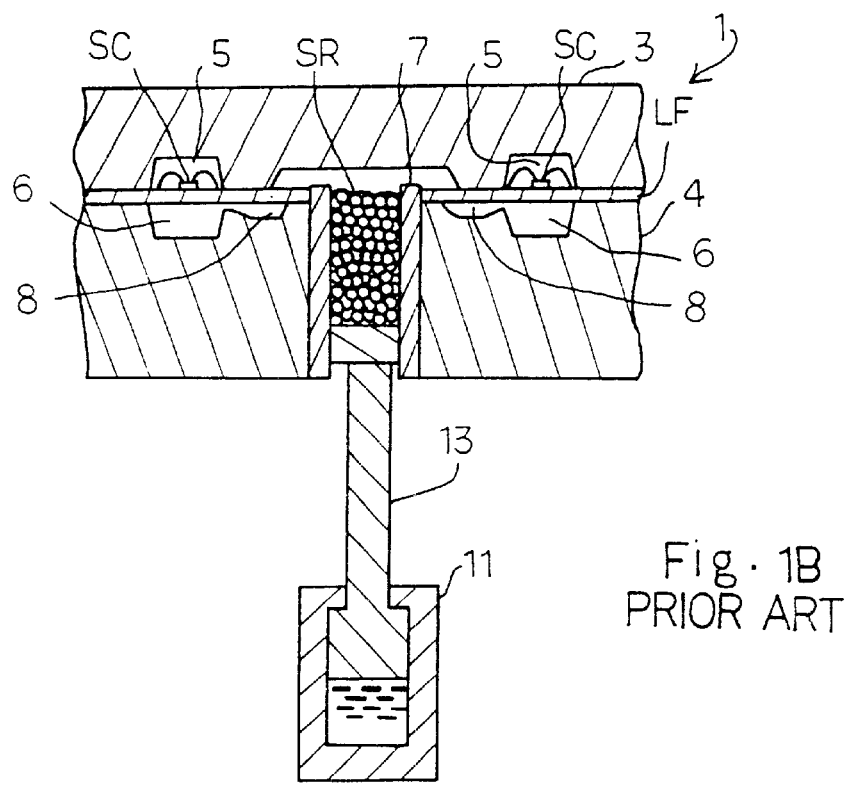
Figure 1C:
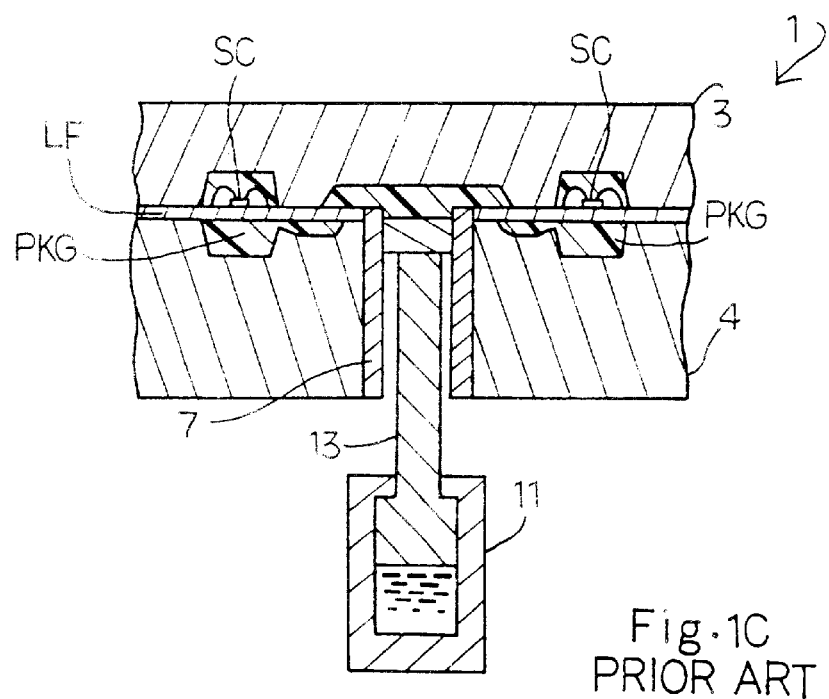
Figure 1D:
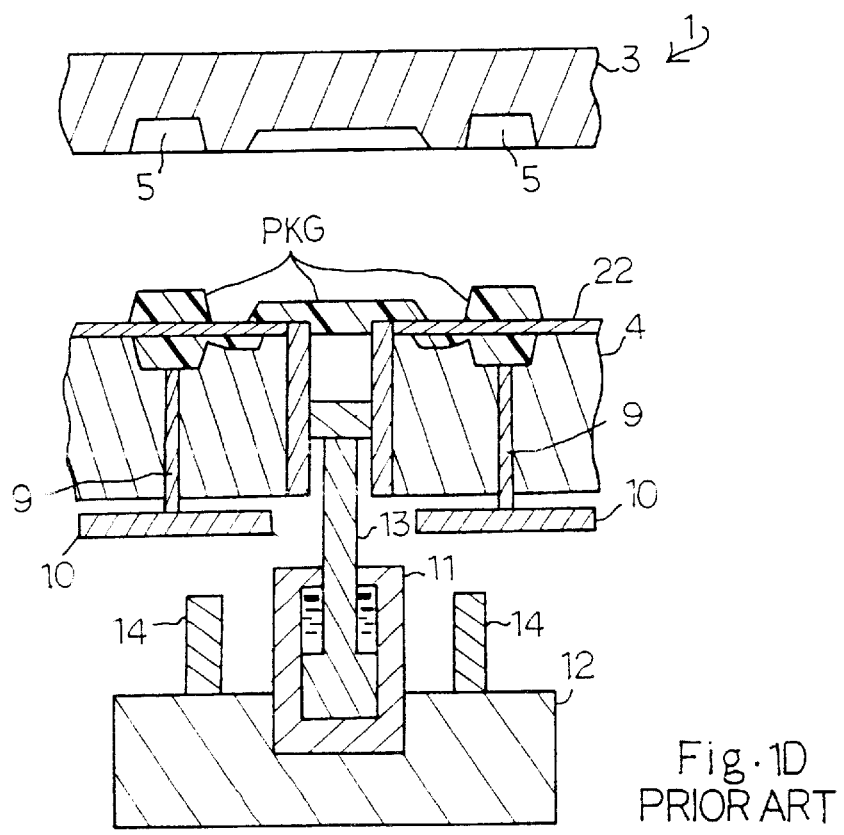
Figure 1E:
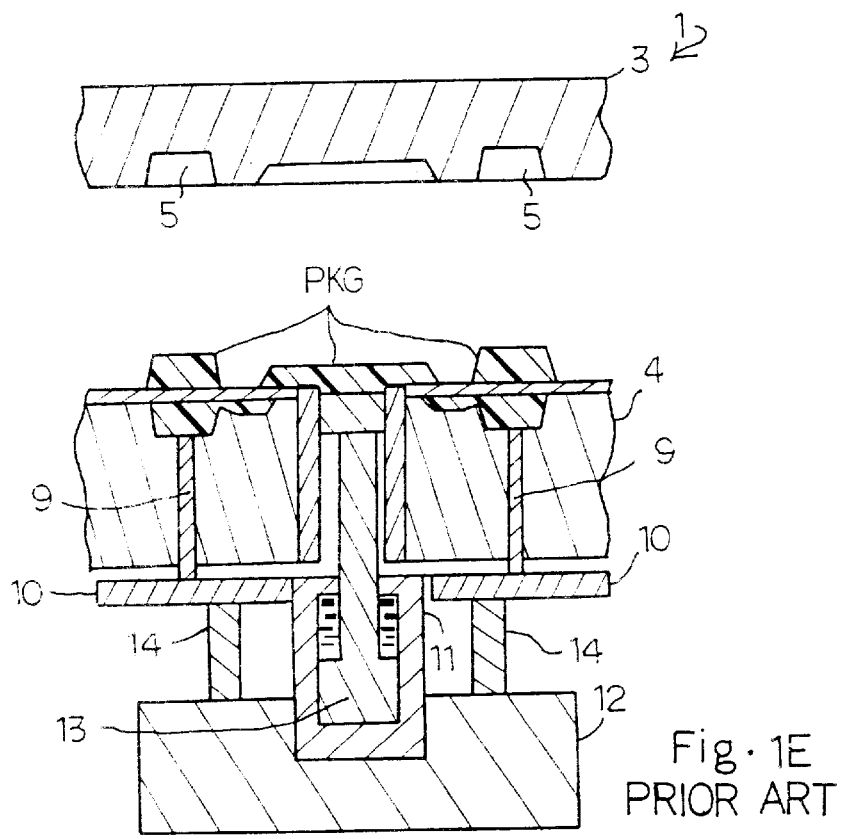
Figure 2:
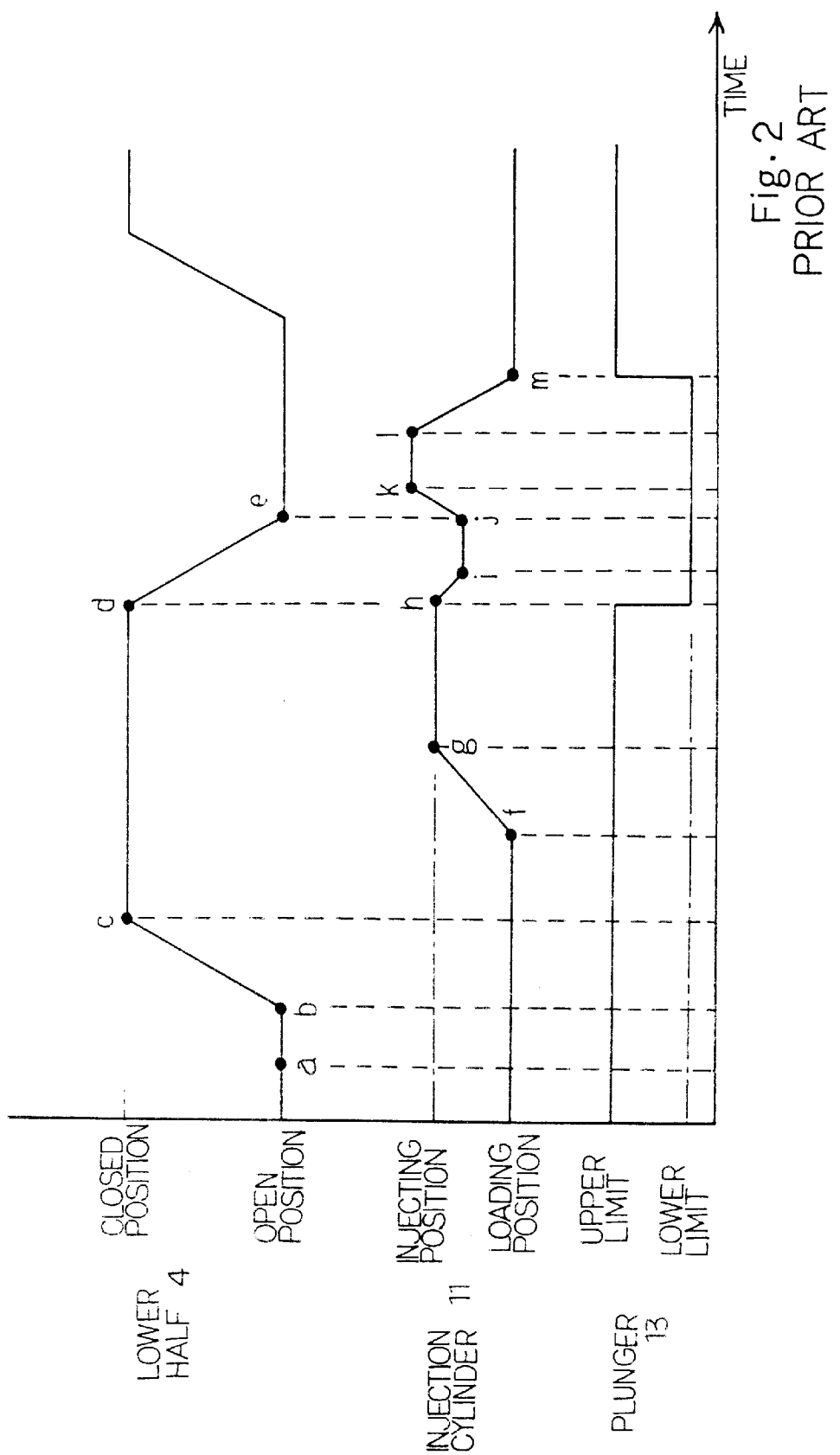
FIG. 2 is a timing chart showing the prior art packaging process.
Figure 3:
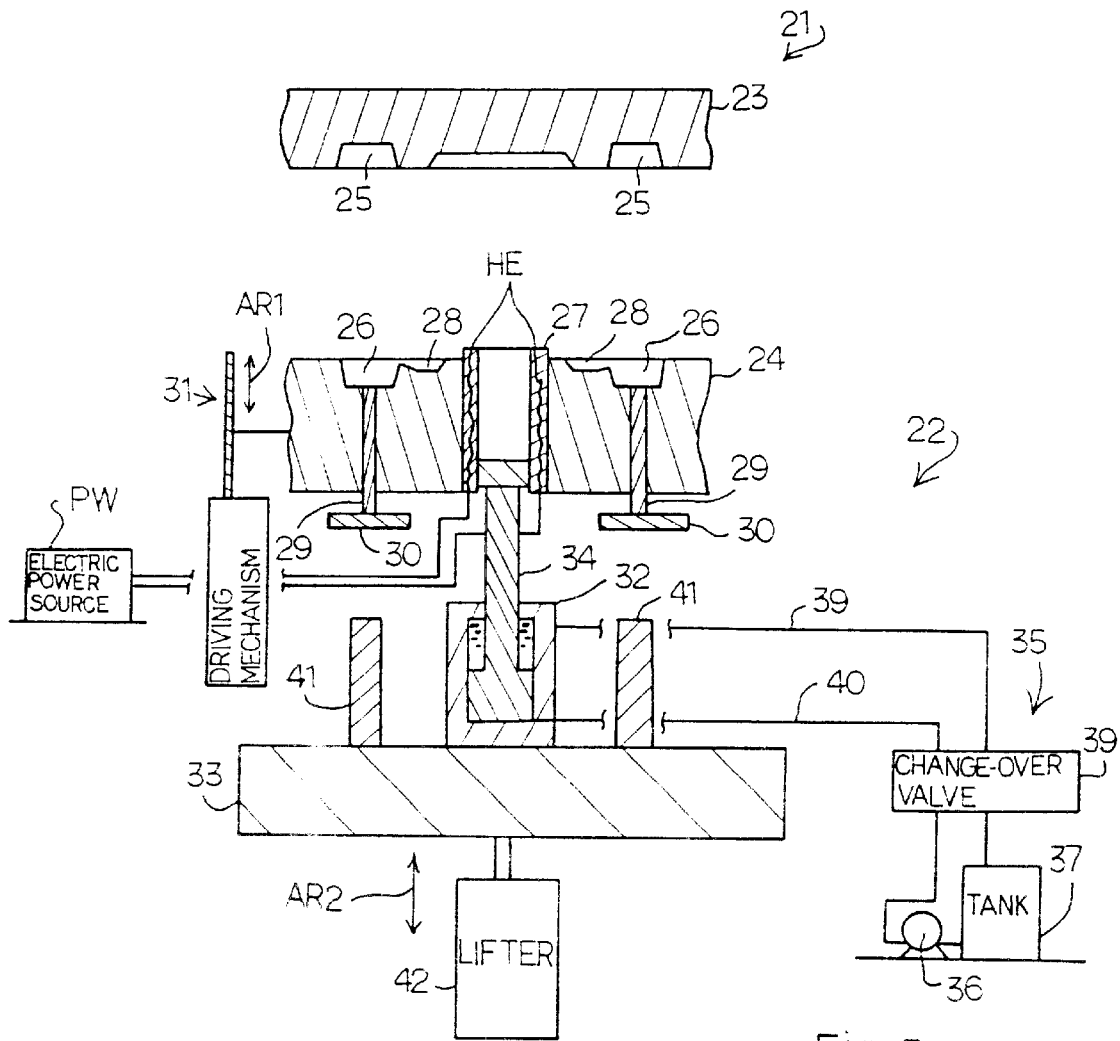
FIG. 3 is a cross sectional view showing a molding apparatus according to the present invention.

FIG. 3 illustrates a molding apparatus used in a packaging process embodying the present invention. The molding apparatus largely comprises a molding die 21 and an injection mechanism 22 The molding die 21 is split into an upper half 23 and a lower half 24, and cavities 25 and 26 are formed in the upper half 23 and the lower half 24, respectively. A pot Z7 is inserted into the lower half 24, and is connected through runners 28 to the cavity 26. A heater HE is provided in the pot 27, and is connected to an electric power source PW.

Ejector pins 29 are slidably inserted into holes formed in the lower half 4, and are projectable into the cavity 26. Knock out plates 30 are attached to the ejector pins 29, a driving mechanism 31 is attached to the lower half 24 for moving the lower half 24 as indicated by arrow ARI. When the lower half 24 is spaced from the upper half 23, the molding die 21 is in an open position. On the other hand, when the lower half 24 is held in contact with the upper half 23, the molding die 21 is in a closed position.

On the other hand, the injection mechanism 22 has an injection cylinder 32 fixed to a base plate 33, and a plunger 34 projects from the cylinder 32. The plunger 34 has one end portion slidably inserted into the cylinder 32 and the other end portion slidably inserted into the pot 27. The cylinder 32 and the plunger 34 define two pressure chambers, and a hydro-pressurizing system 35 is connected to the two pressure chambers in the cylinder 32. The hydro-pressurizing system 35 includes a pump 36 and a reservoir tank 37, and a change-over valve 38 selectively connects the pump 36 and the reservoir tank 37 to the two chambers through flexible tubes 39/40. The pump 36 supplies high-pressure oil to one of the pressure chambers, and the high pressure oil returns from the other pressure chamber to the reservoir tank 37. When the high pressure oil is supplied to the lower pressure chamber, the plunger 34 projects from the cylinder 32, and is slidably moved in the pot 27. On the other hand, when the change-over valve 39 supplies the high-pressure oil to the upper pressure-chamber, the plunger 34 is retracted into the cylinder 32. Thus, the plunger 34 is moved with respect to the cylinder 32, and is changed between an upper limit and a lower limit.

Knock out rods 41 are upright from the base plate 33, and are aligned with the knock out plates 30. A lifter 42 is connected to the base plate 33, and moves the base plate 33 and, accordingly, the cylinder 32 in the direction indicated by arrow AR2. Thus, the lifter 42 changes the base plate 33 and the cylinder 32 between a loading position and an injecting position.

As will be understood from the foregoing description, the molding apparatus has three movable components, i.e., the lower half 24, the plunger 34 and the base plate 33, and changes the relative positions of the movable components 24, 34 and 33 during a packaging operation as described hereinlater. The relative positions shown in FIG. 3A are referred to as an initial position. The heater HE, the electric power source PW, ejector pins 29, the knock out plates 30, the driving mechanism 31, the base plate 33, the knock out rods 41, the hydro-pressurizing system 35 and the lifter 42 are deleted from FIGS. 3B to 3F for the sake of simplicity.

FIGS. 4A to 4E illustrates a process for packaging a semiconductor chip in synthetic resin embodying the present invention, and FIG. 5 illustrates the relative positions between the three movable components, i.e., the lower half 34, the base plate 33 and the plunger 34.

Figure 4A:
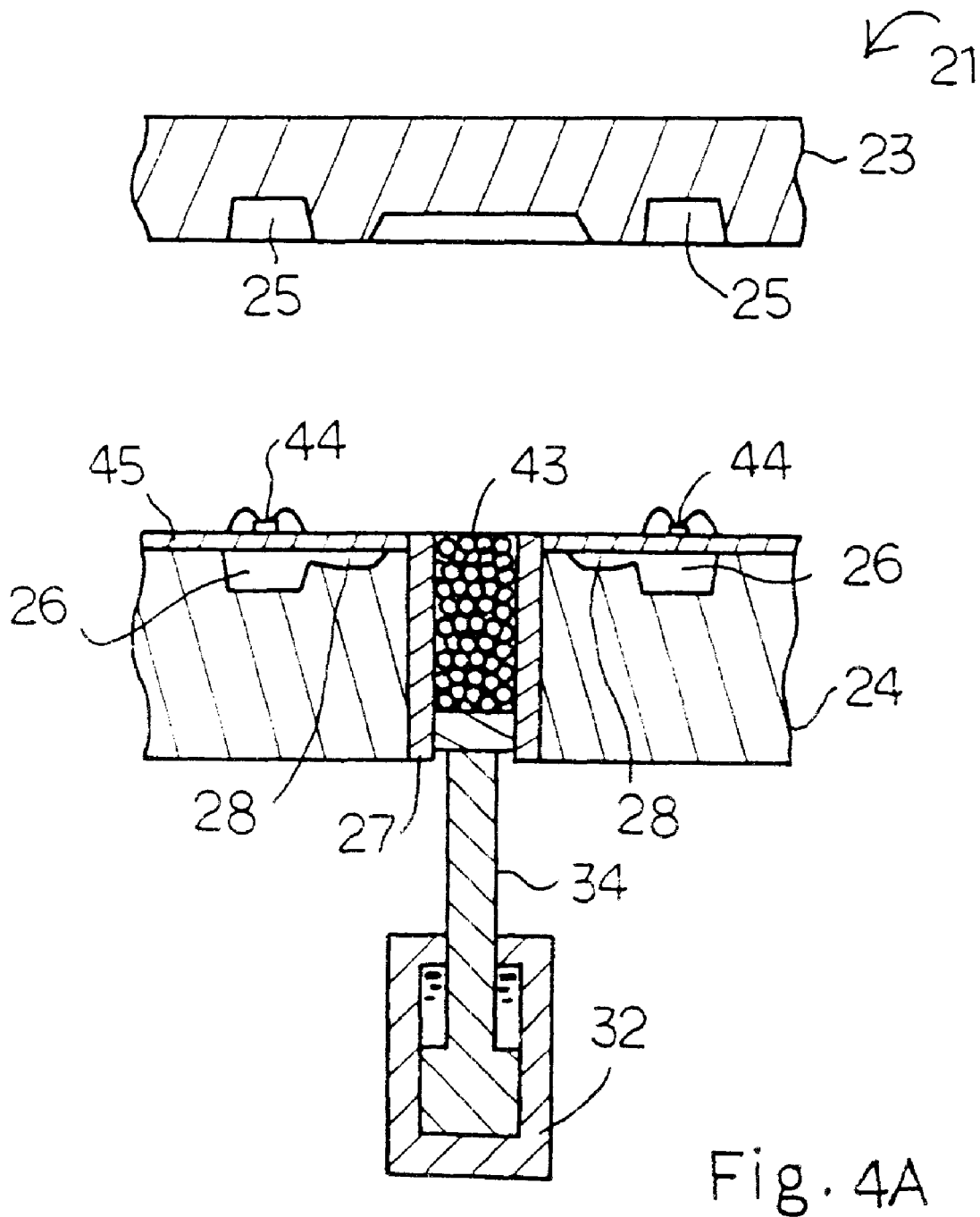
FIGS. 4A to 4E are cross sectional views slowing a process of packaging a semiconductor chip in synthetic resin according to the present invention.

Firstly, the molding apparatus keeps the three movable components 24, 33/32 and 34 in the initial position shown in FIG. 3. The lower half 34 is spaced from the upper half 23, and the base plate/cylinder 33/32 and the plunger 34 are in the loading position and the lower limit, respectively. Granular synthetic resin 43 is loaded into the pot 27, and bare semiconductor chips 44 mounted on a lead frame 45 are placed on the lower half 24 as shown in FIG. 4A.

The electric power source PW supplies electric current to the heater HE at time t1, and the heater HE starts to melt the granular synthetic resin 43 in the pot 27. The driving mechanism 31 starts to move the lower half 24 toward the upper half 23 at time t2, and the lower half 24 is brought into contact with the upper half 23 at time t3. Then, the molding die 21 enters into the closed position.

Figure 4B:
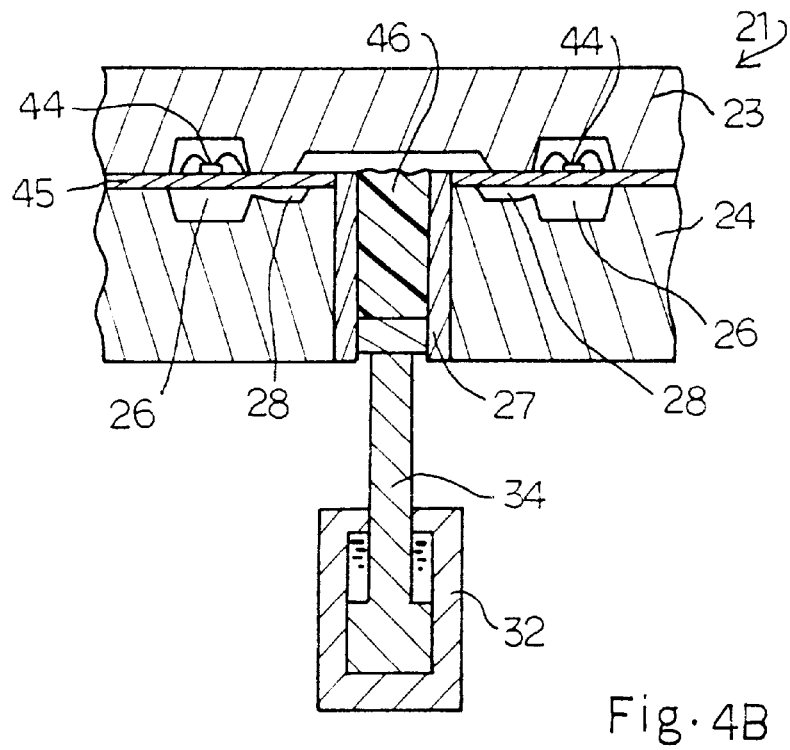
Figure 4C:
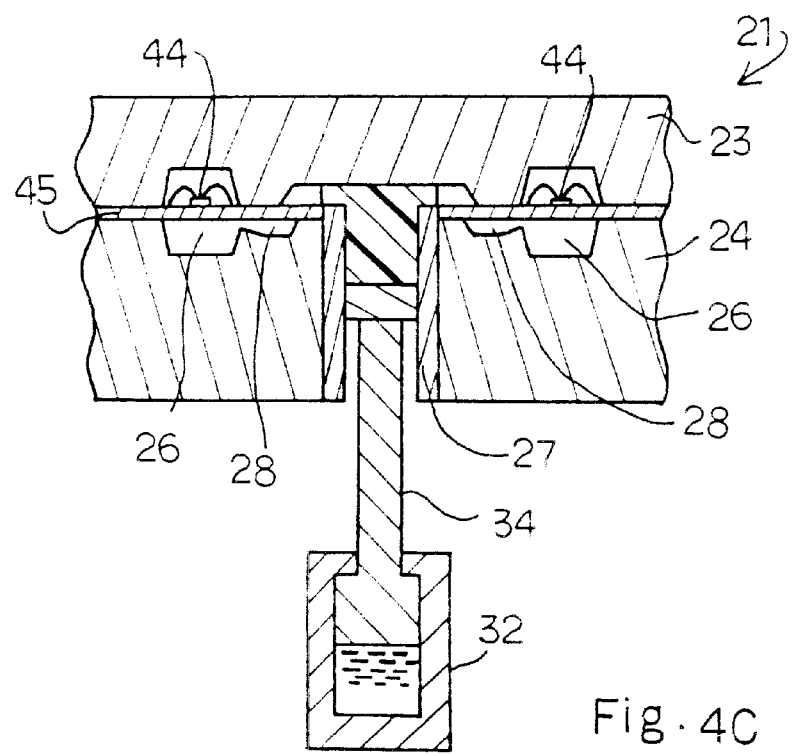

The heater HE heats the granular synthetic resin 43 until time t4, and makes the granular synthetic resin 43 softened as shown in FIG. 4B. In this instance, time interval T between time t2 and t4 is equal to or less than 25 seconds, and the granular synthetic resin 46 becomes soft available for injection. The lifter 42 and the hydro-pressurizing system 35 start to upwardly move the base plate/cylinder 33/32 and the plunger 34 at time t4. The plunger 34 pushes the soft synthetic resin 46 toward the upper half 23, and the soft synthetic resin 46 is pressed against the upper half 23 as shown in FIG. 4C. As a result, the air mixed into the granular synthetic resin 43 is evacuated from the soft synthetic resin 46.

Figure 4D:
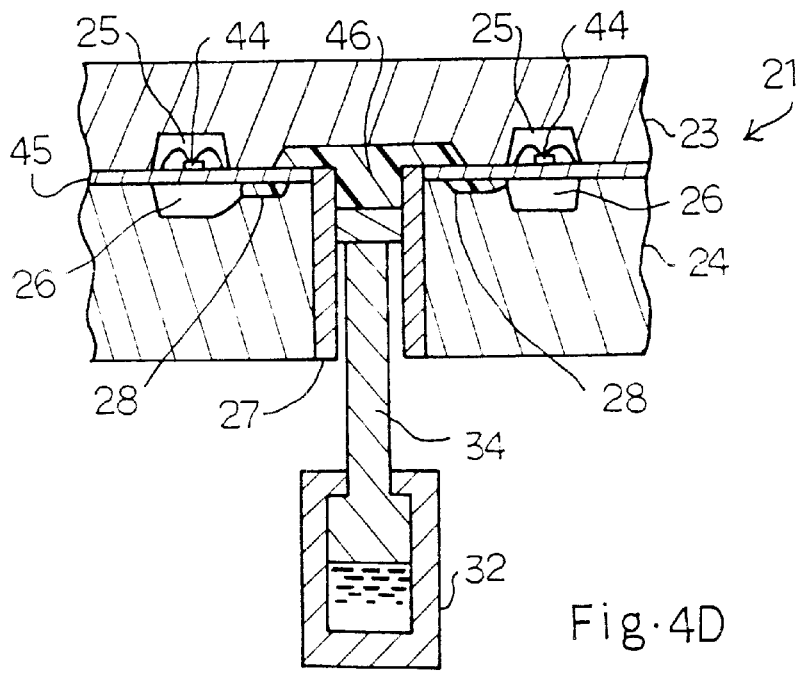
Figure 4E:
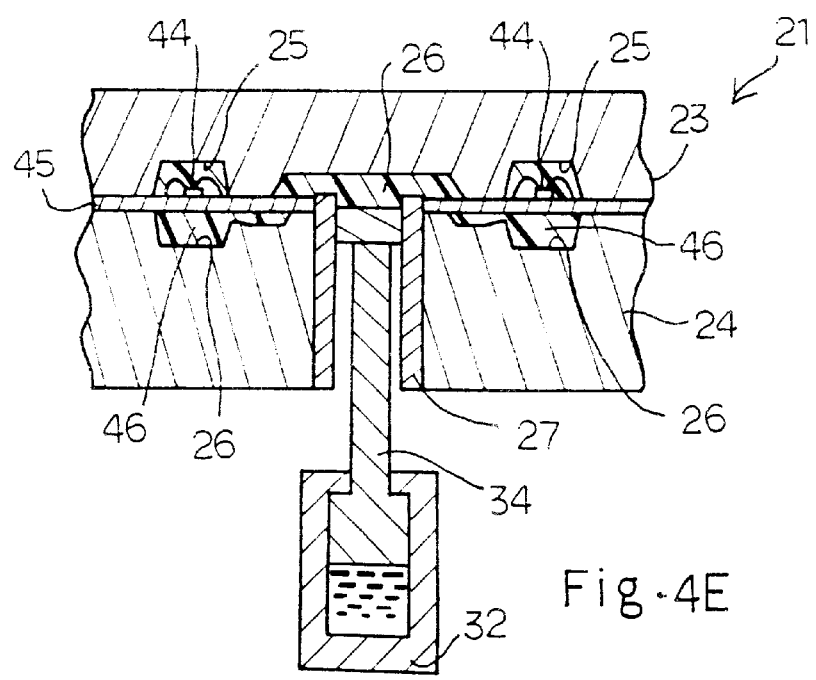

The plunger 34 continuously applies pressure to the soft synthetic resin 46, and pushes out the soft synthetic resin 46 into the runner 28 as shown in FIG. 4D. The plunger 34 reaches the upper limit at time t5, and the soft synthetic resin 46 is spread over the cavities 25/26 as shown in FIG. 4E. Thus, the bare semiconductor chips 44 mounted on the lead frame 45 are sealed in a synthetic resin package.

Subsequently, the driving mechanism 31 starts to downwardly move the lower half at time t6, and the plunger is retracted into the cylinder 32. The lifter 42 starts to downwardly move the cylinder 34 and the base plate 33 at time t6, and stops the cylinder 34 and the base plate 33 at an intermediate position at time t7. The plunger 34 is separated from the synthetic resin package. The lower half 34 reaches the lower limit at time t8, and the molding die 21 enters into the open position.

The lifter 42 starts to upwardly move the base plate 33 and the cylinder 32 at time tS, and the knock out rods 41 are brought into contact with the knock out plates 30 on the way toward the injecting position. The plunger 34 is lifted together with the cylinder 32, and the plunger 34 is brought into contact with the synthetic resin package also on the way toward the injecting position. The base plate/cylinder 33/32 and the plunger 34 are further moved upwardly by 1–2 millimeters, and separate the synthetic resin package from the lower half 24 at time t9. Thus, the synthetic resin package is separated from the lower half 24, and is taken out from the molding die 21 until time t10.

The lifter 42 starts to downwardly move the base plate/cylinder 33/32 at time t10, and the molding apparatus returns to the initial position at time t11.

As will be appreciated from the foregoing description, the plunger 34 presses the soft synthetic resin 46 against the upper half 23 so as to evacuate the air from the soft synthetic resin. For this reason, a void does not take place in the synthetic resin package. The soft synthetic resin 46 is directly produced from the granular synthetic resin 43, and the process is simple. Moreover, the soft synthetic resin 46 is pressed in the molding die 21, and the molding apparatus is simple.

Second Embodiment

Figure 6:
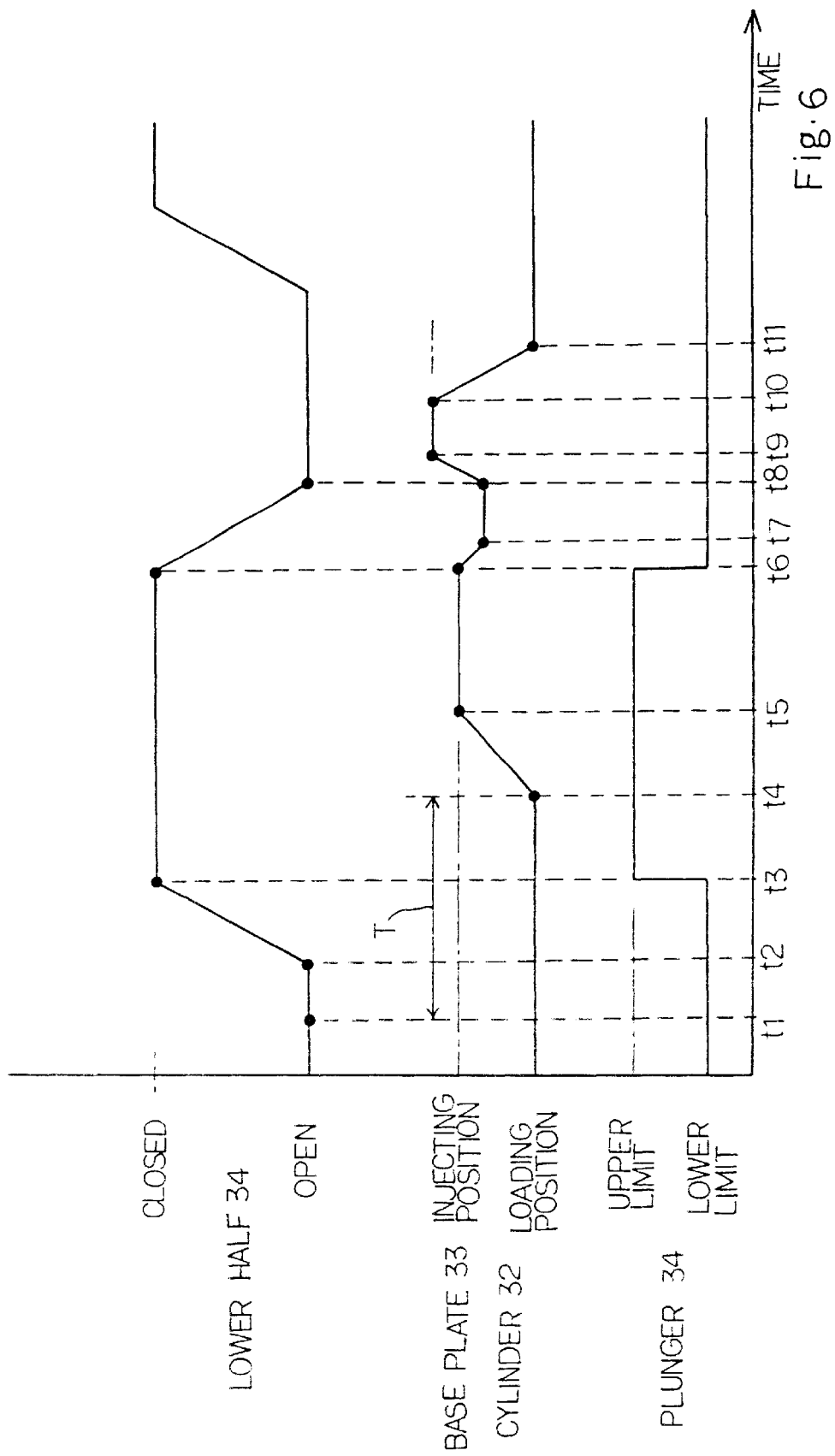
FIG. 6 is a timing chart showing another process for packaging a semiconductor chip in synthetic resin according to the present invention.

FIG. 6 illustrates another process for packaging a bare semiconductor chip in synthetic resin embodying the present invention. The molding apparatus shown in FIG. 3 is used in the process implementing the second embodiment. The second embodiment is only different from the first embodiment in the motion of the plunger 34, and the lower half 34 and the base plate/cylinder 33/32 behave as similar to those of the first embodiment. For this reason, description is focused on the plunger 34.

The granular synthetic resin 43 is also heated from time t2 to time t4, and the time interval T is equal to or less than 25 seconds. In this instance, when the lower half 24 is brought into contact with the upper half 23, the hydro-pressurizing system 35 starts to upwardly move the plunger 34. If the pot 27 is small in diameter, only a small amount of granular synthetic resin 43 is supplied to the pot 27, and the granular synthetic resin 43 is immediately softened. For this reason, the plunger 34 is moved at the entry into the closed position, and evacuates the air from the soft synthetic resin 46 by applying pressure thereto. When the pot 27 has the diameter equal to or less than 15 millimeters, the second embodiment is desirable.

The second embodiment achieves all the advantages of the first embodiment, and enhances the throughput.

Third Embodiment

FIG. 7 illustrates yet another process for packaging a bare semiconductor chip in synthetic resin embodying the present invention. The molding apparatus shown in FIG. 3 is used for the packaging process implementing the third embodiment. The relative positions from time t7 to time t12 is similar to the relative positions from time t6 to time t11 of the first embodiment, and description is focused on the relative positions from time t1 to time t6.

The heater HE starts to heat the granular synthetic resin at time t1, and the granular synthetic resin 43 is softened. The driving mechanism 31 starts to upwardly move the lower half 34 at time t2. The hydro-pressurizing system 35 upwardly moves the plunger 34 at time t3, and applies pressure to the soft synthetic resin 46 so as to eliminate the air from the soft synthetic resin 46. The lifter 42 starts to upwardly move the base plate/cylinder 33/32 at time t3, and the base plate/cylinder 33/32 reaches an intermediate position on the way to the upper limit at time t4. The lower half 34 is brought into contact with the upper half 33 at time t4. When the base plate/cylinder 33/32 reaches the intermediate position, the plunger 34 pushes out the soft synthetic resin 46 into the runners 28, and the soft synthetic resin 46 proceeds to the boundary between the runners 28 and the cavities 25/26 as shown in FIG. 4D.

The heater HE stops heating at time t5, and the time period T between time t1 and time t5 is 25 seconds. The lifter 42 starts to further upwardly move the base plate/cylinder 33/32 at time t5, and reaches the upper limit at time t6. While the base plate/ cylinder 33/32 are being upwardly moved together with the plunger 34, the soft synthetic resin 46 flows into the cavities 25/26, and the semiconductor bare chaps 44 are sealed in the synthetic resin 46.

The synthetic resin 46 is heated until time t5, and the soft synthetic resin 46 is never solidified in the runners 28. For this reason, the packaging process is desirable for the molding die 21 with the longest runner 28 greater than 30 millimeters. The heater HE starts to soften the granular synthetic resin 43 before the upward motion of the lower half 34, and accelerates the molding operation.

Fourth Embodiment

Figure 8A:
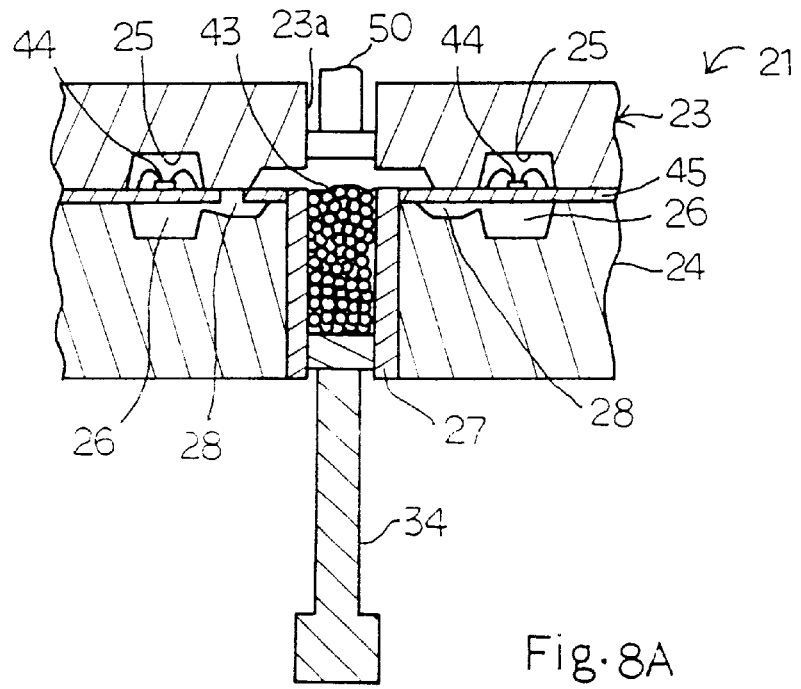
FIGS. 8A and 8B are cross sectional views showing essential steps of still another process for packaging a semiconductor chip in synthetic resin.
Figure 8B:
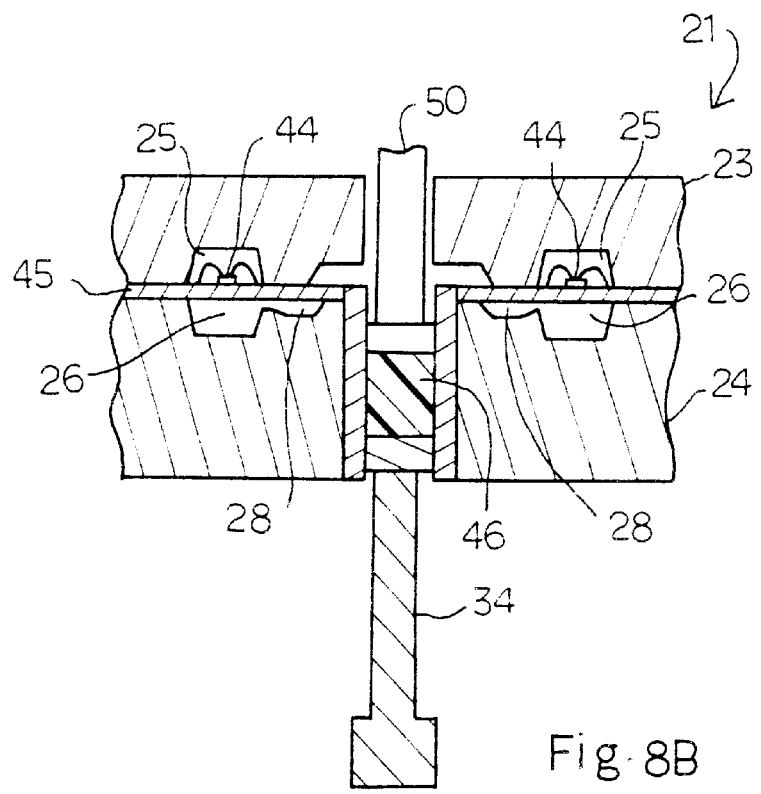

FIGS. 8A and 8B illustrate essential steps of still another process for packaging a bare semiconductor chip in synthetic resin embodying the present invention. A molding apparatus used for the fourth embodiment is different from the molding apparatus shown in FIG. 3. A through-hole 23a is formed in the upper half 23, and is located over the pot 27. A plunger 50 is slidably inserted into the through-hole 23a as shown in FIG. 8A, and is projectable into the pot 27. The cylinder 32 is not provided for the plunger 34, and the soft synthetic resin 46 is pressed by the plunger 50 instead of the plunger 34 as shown in FIG. 8B. The plunger 50 applies pressure to the soft synthetic resin 46 for 0.5 second, and returns to the initial position shown in FIG. 8A.

The process implementing the fourth embodiment is similar to the first embodiment except for the pressurization by using the plunger 50. The step shown in FIG. 8A and the step shown in FIG. 8B are corresponding to the step shown in FIG. 4B and the step shown in FIG. 4C. The other steps are similar to those of the first embodiment, and no further description is incorporated hereinbelow for the sake of simplicity.

As will be appreciated from the foregoing description, the soft synthetic resin is pressed before the injection, and the pressurization eliminates the air mixed in the granular synthetic resin from the soft synthetic resin. For this reason, the soft synthetic resin is directly produced from the granular synthetic resin, and the process sequence and, accordingly, the molding apparatus are made simple.

Although particular embodiments of the present invention have been shown and described, it will be obvious to those skilled in the art that various changes and modifications may be made without departing from the spirit and scope of the present invention.

For example, the plunger 50 may be controlled as similar to the plunger 34 in the process implementing the second embodiment. Namely, when the lower half 24 is brought into contact with the upper half 23, the plunger 50 is downwardly moved so as to press the soft synthetic resin 46 for 0.5 second. Then, the plunger 50 returns to the initial position, and, thereafter, the plunger injects the soft synthetic resin 46 into the cavities 25/26.

Vacuum may be created in the cavities 25/26 from the entry into the closed position to the completion of the injection. The vacuum enhances the injection efficiency, and perfectly eliminates void from the synthetic resin package.

The packaging processes according to the present invention are available for any kind of product to be sealed in a synthetic resin package.

What is claimed is:

1. A process for packaging an electronic component in synthetic resin, comprising:
    a) accommodating the electronic component in a molding die;
    b) accommodating granular synthetic resin in a pot;
    c) softening said granular synthetic resin while it is in said pot so as to produce soft synthetic resin; and
    d) then, during a first stage, moving a plunger at a high speed to pressurize said soft synthetic resin and eliminate air from said soft synthetic resin, and then moving said plunger at a slower speed in a second stage to spread said soft synthetic resin from said pot over an inside space of said molding die so as to seal the electronic component in a synthetic resin package.

2. The process as set forth in claim 1, in which the electronic component is a semiconductor bare chip mounted on a lead frame.

3. The process as set forth in claim 1, in which heat is applied to said granular synthetic resin for 25 seconds or less so as to soften said granular synthetic resin.

4. The process as set forth in claim 1, in which said second stage starts immediately after said pressurizing in said first stage.

5. The process as set forth in claim 1, in which said pressurizing in said first stage starts when a lower half of said molding die is brought into contact with an upper half of said molding die.

6. The process as set forth in claim 5, in which said soft synthetic resin is supplied from said pot to said inside space, and said pot has a diameter equal to or less than 15 millimeters.

7. A process for packaging a semiconductor chip mounted on a lead frame in synthetic resin, comprising:
    a) accommodating the semiconductor chip mounted on the lead frame in a molding die;
    b) accommodating granular synthetic resin in a pot;
    c) softening said granular synthetic resin while it is in said pot so as to produce soft synthetic resin; and
    d) then moving a plunger in a stepwise motion to first compress said soft synthetic resin while it is at least partially within said pot so as to evacuate the air from said soft synthetic resin; and to then move said plunger to spread said soft synthetic resin from said pot over an inside space of said molding die so as to seal said product in a synthetic resin package, said step (d) starting before completion of said step (c) and said inside space having cavities for accommodating said product and runners guiding said soft synthetic resin to said cavities, and said step d) including the sub-steps of
        d-1) introducing said soft synthetic resin into said runners before said completion of said step c),
        d-2) introducing said soft synthetic resin into said cavities after said completion of said step c).

8. The process as set forth in claim 7, in which at least one of said runners has a length greater than 30 millimeters.

9. A process for packaging a semiconductor chip mounted on a lead frame in synthetic resin, comprising:
    a) accommodating the semiconductor chip mounted on the lead frame in a molding die;
    b) accommodating granular synthetic resin in a pot;
    c) softening said granular synthetic resin while it is in said pot so as to produce soft synthetic resin; and
    d) then, during a first stage, moving a plunger in a stepwise motion to first compress said soft synthetic resin while it is at least partially within said pot so as to evacuate the air from said soft synthetic resin; and to then move said plunger in a second stage to spread said soft synthetic resin from said pot over an inside space of said molding die so as to seal said product in a synthetic resin package, said inside space having cavities for accommodating said product and runners guiding said soft synthetic resin to said cavities, and said step d) including the sub-steps of:
        d-1) introducing said soft synthetic resin into said runners before said second stage, and
        d-2) introducing said soft synthetic resin into said cavities after said first stage.

10. The process as set forth in claim 9, wherein said plunger moves at a slower speed in said second stage than said first stage.

11. The process as set forth in claim 9, in which at least one of said runners has a length greater than 30 millimeters.

* * * * *